(12) United States Patent
Kniep (10) Patent No.: US 11,260,851 B2
(45) Date of Patent: Mar. 1, 2022

(54) METHOD OF POSITIONING VEHICLE DURING PARKING OPERATION

(71) Applicant: Nissan North America, Inc., Franklin, TN (US)

(72) Inventor: Heather Kniep, Chandler, AZ (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 111 days.

(21) Appl. No.: 16/554,308

(22) Filed: Aug. 28, 2019

(65) Prior Publication Data
US 2021/0061262 A1    Mar. 4, 2021

(51) Int. Cl.
| | | |
|---|---|---|
| *B60W 30/06* | (2006.01) | |
| *B62D 15/02* | (2006.01) | |
| *G08G 1/16* | (2006.01) | |
| *G05D 1/02* | (2020.01) | |

(52) U.S. Cl.
CPC ......... *B60W 30/06* (2013.01); *B62D 15/0285* (2013.01); *G05D 1/0238* (2013.01); *G08G 1/168* (2013.01)

(58) Field of Classification Search
CPC . B60W 30/06; G05D 1/0238; B62D 15/0285; G08G 1/168
See application file for complete search history.

(56) References Cited

U.S. PATENT DOCUMENTS

| | | | |
|---|---|---|---|
| 7,021,237 B1 | 4/2006 | Benjamin | |
| 9,581,997 B1* | 2/2017 | Penilla et al. ......... | G08G 1/168 |
| 10,011,274 B2* | 7/2018 | Holland-Letz ........ | B60W 30/06 |
| 10,106,153 B1* | 10/2018 | Xiao et al. ........... | B60W 30/06 |
| 10,424,204 B1* | 9/2019 | Han ......................... | B60Q 1/48 |
| 2002/0087268 A1* | 7/2002 | Cazzell .................. | B60Q 9/007 |
| | | | 701/301 |
| 2007/0100543 A1 | 5/2007 | Kato et al. | |
| 2009/0157268 A1* | 6/2009 | Chiba ..................... | G08G 1/168 |
| | | | 701/53 |
| 2010/0274474 A1 | 10/2010 | Takano | |
| 2010/0283632 A1 | 11/2010 | Kawabata et al. | |

(Continued)

FOREIGN PATENT DOCUMENTS

| | | | | |
|---|---|---|---|---|
| DE | 102006035376 A1 | | 5/2007 | |
| DE | 102008033925 A1 | * | 1/2010 | ......... B62D 15/0285 |

(Continued)

OTHER PUBLICATIONS

Translation of DE 102008033925-A1, Description and Claims, 10 pages (Year: 2008).*

(Continued)

*Primary Examiner* — Dale W Hilgendorf
(74) *Attorney, Agent, or Firm* — Global IP Counselors, LLP (57) ABSTRACT

A method of positioning a vehicle during a parking operation includes positioning a vehicle in a parked position during a first parking operation, and detecting a distance of the vehicle from an object when the vehicle is in the parked position. The distance is stored in a vehicle memory. The distance from the object is recalled during a second parking operation with the vehicle. An indication is provided during the second parking operation when the vehicle is spaced from the object by the distance.

19 Claims, 6 Drawing Sheets

(56) References Cited

U.S. PATENT DOCUMENTS

| | | | |
|---|---|---|---|
| 2013/0085637 A1* | 4/2013 | Grimm | G05D 1/00 |
| | | | 701/25 |
| 2013/0166190 A1 | 6/2013 | Ikeda et al. | |
| 2015/0219760 A1* | 8/2015 | Hiramaki | B62D 15/027 |
| | | | 367/99 |
| 2016/0288833 A1 | 10/2016 | Heimberger et al. | |
| 2016/0311429 A1 | 10/2016 | Holland-Letz | |
| 2017/0212519 A1* | 7/2017 | Nordbruch | G08G 1/04 |
| 2018/0194344 A1* | 7/2018 | Wang et al. | B60W 30/06 |
| 2020/0198623 A1* | 6/2020 | Gunzel | B60W 30/06 |
| 2020/0317188 A1* | 10/2020 | Lai | G08G 1/144 |
| 2021/0094536 A1* | 4/2021 | Suzuki | G08G 1/168 |
| 2021/0162985 A1* | 6/2021 | Romero Leon et al. | |
| | | | B60W 30/06 |

FOREIGN PATENT DOCUMENTS

| | | |
|---|---|---|
| DE | 102009057837 A1 | 6/2011 |
| EP | 2580097 B1 | 9/2015 |
| EP | 2601481 B1 | 5/2017 |
| EP | 3173817 A1 | 5/2017 |
| EP | 3086994 B1 | 3/2018 |
| EP | 3318470 A1 | 5/2018 |
| EP | 2920778 B1 | 3/2019 |
| WO | 2007122861 A1 | 11/2007 |
| WO | 200981519 A1 | 7/2009 |
| WO | 201273592 A1 | 6/2012 |
| WO | WO-2017118546 A1 * | 7/2017 ............. G08G 1/168 |

OTHER PUBLICATIONS

Translation of WO 2017118546-A1, Description and Claims, 35 pages (Year: 2017).*

* cited by examiner

METHOD OF POSITIONING VEHICLE DURING PARKING OPERATION

BACKGROUND

Field of the Invention

The present invention generally relates to a method of positioning a vehicle during a parking operation. More specifically, the present invention relates to a method of storing a distance of a parked vehicle from an object during a first parking operation, and recalling the stored distance during a second parking operation to facilitate positioning the vehicle with respect to the object.

Background Information

Devices exist that facilitate positioning a vehicle relative to an object when parking at the same location. For example, a tennis ball can be hung on a string from a ceiling of a garage to let a driver know when the vehicle is positioned a desired distance from a wall of the garage. The tennis ball is hung such that the windshield of the vehicle contacts the tennis ball when the vehicle is positioned a desired distance from the wall of the garage during a parking operation. However, the tennis ball does not facilitate positioning a different vehicle from the wall of the garage during a parking operation as vehicles can have different sizes. Further, the tennis ball is not easily moved to a different parking location, such as a different garage, to facilitate positioning the vehicle during a parking operation.

Alternatively, other devices, such as parking mats or laser parking assist devices, can be used to repeatedly park a vehicle in the same position with respect to an object at one location. However, such devices cannot be easily manipulated when another distance with respect to the object is desired at that location. Further, such devices cannot be easily moved to facilitate positioning the vehicle with respect to another object during a parking operation at another location.

SUMMARY

An object of the disclosure is to provide a method of positioning a vehicle during a parking operation.

In view of the state of the known technology, one aspect of the present disclosure is a method of positioning a vehicle during a parking operation. A vehicle is positioned in a parked position during a first parking operation. A distance of the vehicle from an object is detected when the vehicle is in the parked position. The distance is stored in a vehicle memory. The distance from the object is recalled during a second parking operation with the vehicle. An indication is provided during the second parking operation when the vehicle is spaced from the object by the distance.

Another aspect of the present invention includes a method of positioning a vehicle during a parking operation. A vehicle is positioned in a first parked position during a first initial parking operation in a first location. A first distance of the vehicle from a first object is detected in the first location when the vehicle is in the first parked position. The distance is stored in a vehicle memory. The vehicle is positioned in a second parked position during a second initial parking operation in a second location. A second distance of the vehicle from a second object is detected in the second location when the vehicle is in the second parked position. The second distance is stored in the vehicle memory. The first distance from the first object is recalled during a first subsequent parking operation with the vehicle in the first location. An indication is provided during the first subsequent parking operation when the vehicle is spaced from the first object by the first distance. The second distance from the second object is recalled during a second subsequent parking operation with the vehicle in the second location. An indication is provided during the second subsequent parking operation when the vehicle is spaced from the second object by the second distance.

Also other objects, features, aspects and advantages of the disclosed parking memory system and method of positioning the vehicle during a parking operation will become apparent to those skilled in the art from the following detailed description, which, taken in conjunction with the annexed drawings, discloses exemplary embodiments of the parking memory system for a vehicle and method for positioning the vehicle during a parking operation.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
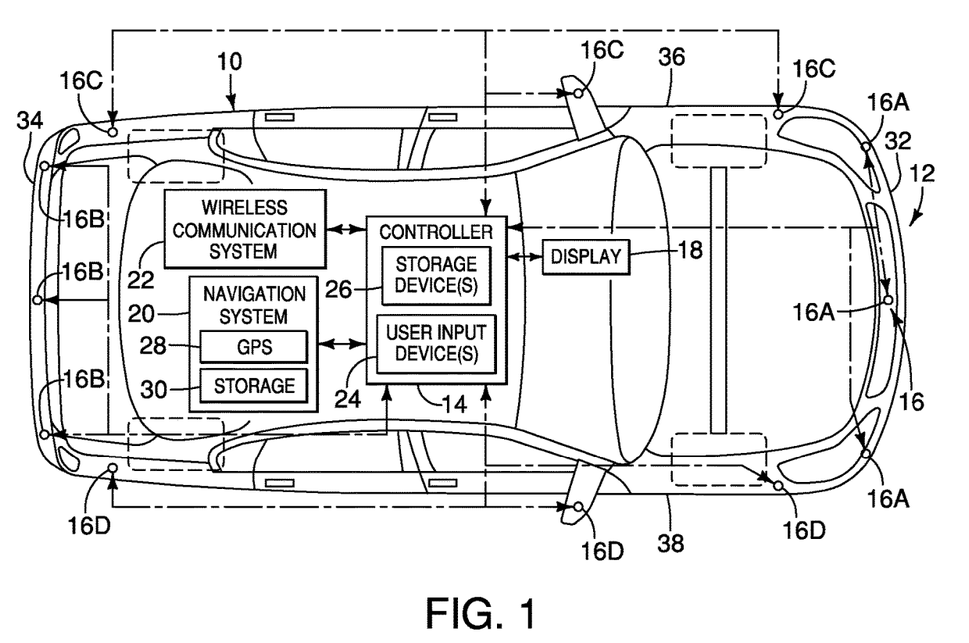
FIG. 1 is a block diagram of a vehicle equipped with a parking memory system in accordance with exemplary embodiments of the present invention.
Figure 2:
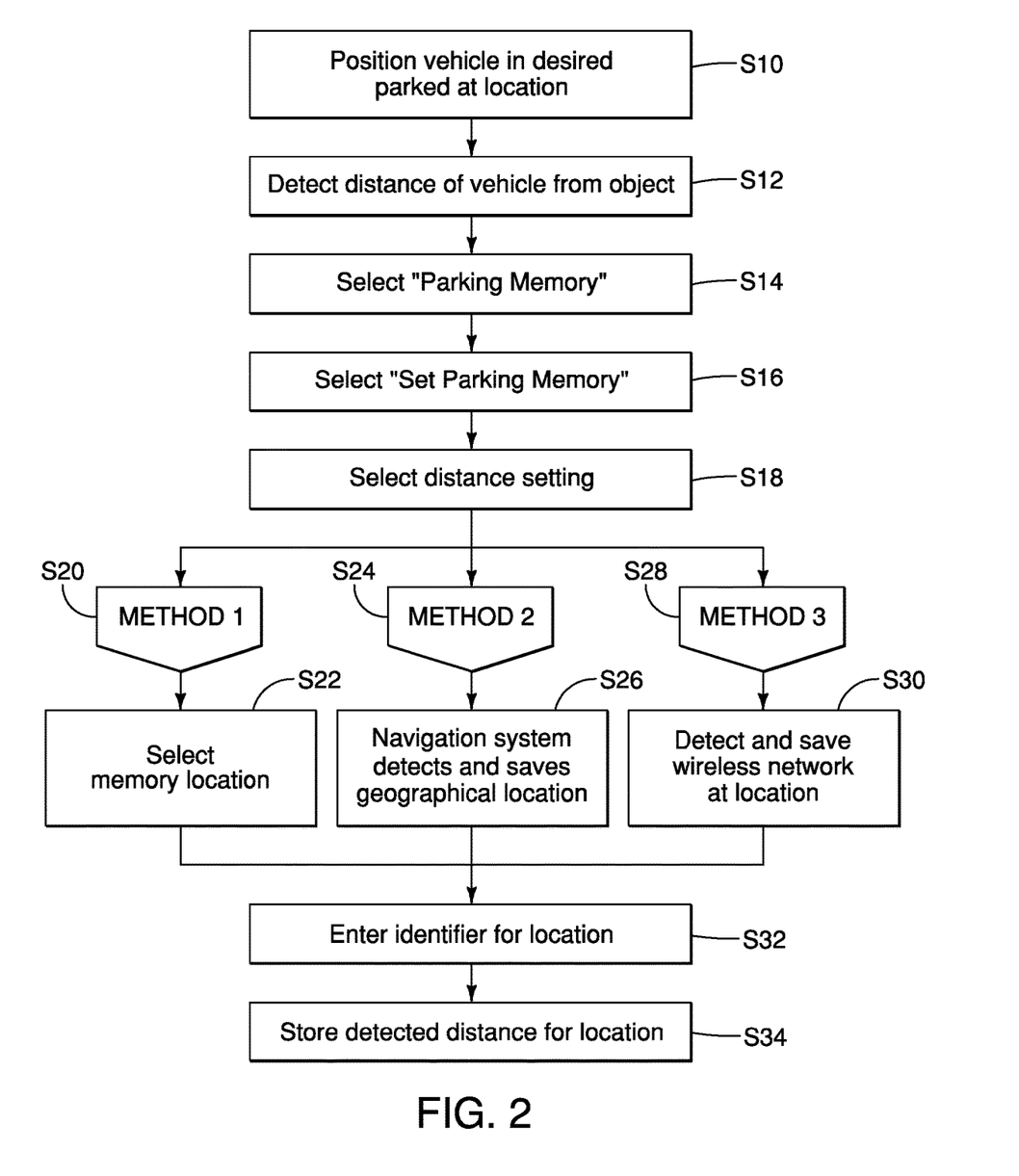
FIG. 2 is a flowchart illustrating setting a parking memory in accordance with exemplary embodiments of the present invention.
Figure 3:
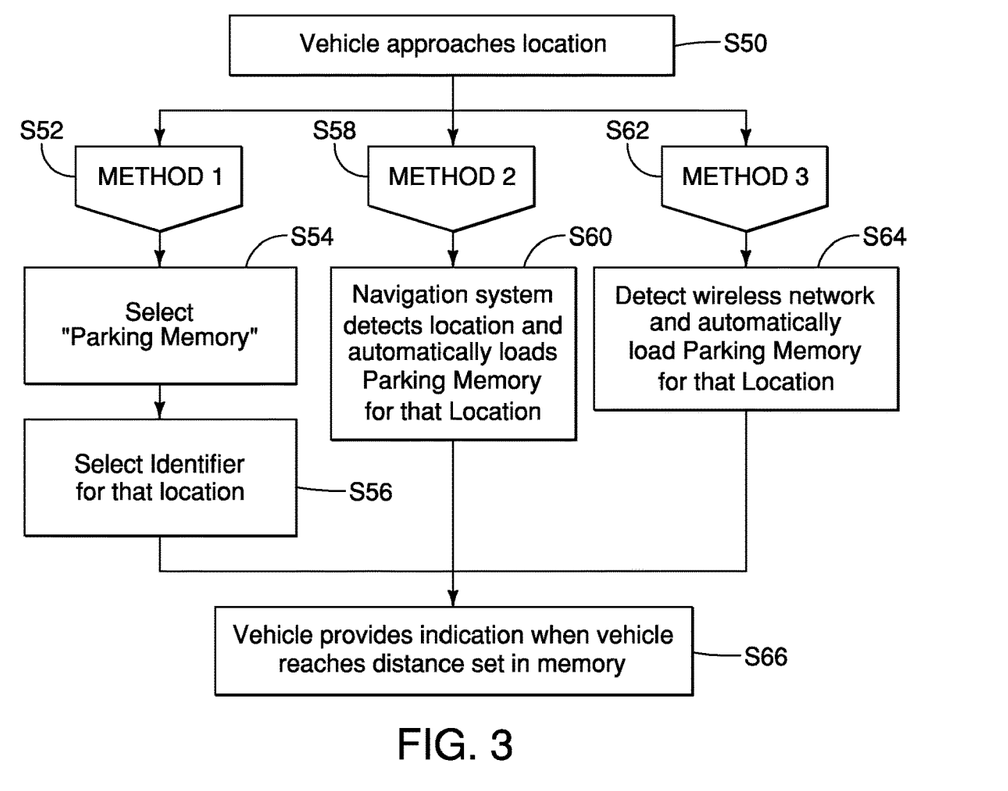
FIG. 3 is a flowchart illustrating recalling a stored parking memory in accordance with exemplary embodiments of the present invention.

Referring initially to FIGS. 1-3, a host vehicle 10 including a parking memory system 12 is illustrated in accordance with exemplary embodiments of the present invention. The vehicle 10, as shown in FIG. 1, is equipped with the parking memory system 12 configured to set and recall a parking memory in accordance with the flowcharts of FIGS. 2 and 3. FIG. 2 illustrates methods of setting a parking memory in accordance with exemplary embodiments of the present invention. FIG. 3 illustrates methods of recalling a stored parking memory in accordance with exemplary embodiments of the present invention.

The parking memory system 12 for the host vehicle 10 is illustrated in accordance with an exemplary embodiment. The parking memory system 12 includes a controller 14, at least one sensor 16, and a display 18.

The controller 14 preferably includes a microcomputer with a control program that controls the components of the parking memory system 12 as discussed below. The controller 14 includes other conventional components, such as an input interface circuit, an output interface circuit, and storage device(s), such as a ROM (Read Only Memory) device and a RAM (Random Access Memory) device. The microcomputer of the controller 14 is at least programmed to control the parking memory system 12 in accordance with the flowcharts of FIGS. 2 and 3 discussed below. The microcomputer of the controller 14 is programmed to control the at least one sensor 16, the display, a navigation system 20, and a wireless communication system 22, and to make determinations or decisions, as discussed herein. The memory circuit stores processing results and control programs, such as ones for the at least one sensor 16, the display 18, the navigation system 20, and the wireless communication system 22. The controller 14 is operatively coupled to the at least one sensor 16, the display 18, a navigation system 20, and a wireless communication system 22 in a conventional manner, as well as other electrical systems in the host vehicle 10, such the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the parking memory system 12 in accordance with the control program. It will be apparent to those skilled in the art from this disclosure that the precise structure and algorithms for the controller 14 can be any combination of hardware and software that will carry out the functions of the exemplary embodiments of the present invention. Furthermore, the controller 14 can communicate with the other components of the vehicle communication system 12 discussed herein via, for example a controller area network (CAN) bus or in any other suitable manner as understood in the art.

The controller 14 can include or be in communication with user input devices 24. The user input devices 24 can include, for example, a human-machine interface (HMI), such as a control panel or a touchscreen graphical user interface (GUI), which enables a user (e.g., the driver and/or passenger) to interact with the parking memory system 12 as understood in the art and discussed herein. The user input device 24 can be incorporated with the display 18 to facilitate interaction by a user. The controller 14 can further include or be in communication with one or more storage devices 26, such as a vehicle memory, that can store information as described herein.

In addition, the host vehicle 10 is equipped with at least one sensor 16 that can generate or capture vehicle environment information. As shown in FIG. 1, the vehicle 10 is provided with a plurality of sensors 16. Four sensors 16A, 16B, 16C and 16D are provided, although any suitable number of sensors can be used. The plurality of sensors 16 include a front sensor 16A, a rear sensor 16B, a first, or driver's, side sensor 16C and a second, or passenger's, side sensor 16D. The front sensor 16A is preferably centrally located on a front bumper 32 of the vehicle 10. Additional front sensors 16A can be disposed on opposite ends of the front bumper 32. The rear sensor 16B is preferably centrally located on the rear bumper. Additional rear sensors 16B can be disposed on opposite ends of the rear bumper 34. The first side sensor 16C and the second side sensor 16D are disposed on the respective sides 36 and 38 of the vehicle 10, such as on an exterior side mirror or proximate a lower surface of the vehicle body structure beneath a door. Additional first and second side sensors 16C and 16D can be spaced along the respective sides 36 and 38 of the vehicle 10. Although the exemplary embodiments of the present invention can be practiced with a single sensor 16, providing a sensor on additional sides of the vehicle 10 allows additional distances from different sides of the vehicle to an object to be detected. Additional sensors 16 on each side of the vehicle increase the accuracy of detecting a distance of the vehicle from an object during a parking operation irrespective of the position of the vehicle with respect to the object during the parking operation.

The at least one sensor 16 can be any of a plurality of differing types of sensors often referred to as detection and ranging sensors or devices. Specifically, the at least one sensor 16 includes an emitting section (not shown) and a detecting section (not shown). The emitting section emits a prescribed signal and the detecting section detects returning signals that are reflected back from surfaces of nearby objects. For example, the at least one sensor 16 can be a sonar emitting and detecting device, a radar emitting and detecting device, an infrared emitting and detecting device and/or a laser light emitting and light detecting device (i.e., LIDAR). Detection and ranging sensors are conventional devices, such that further description is omitted for the sake of brevity. The distance between the detected object, such as a wall 48 (FIG. 5) and the respective adjacent outer surface of the vehicle 10 is determined by the controller 14 using object information detected by the at least one sensor 16.

At least one sensor 16 is provided such that a distance between an object and the side of the vehicle on which the sensor 16 is disposed can be detected. Preferably, at least one sensor 16 is disposed at each of the front 32 and the rear 34 of the vehicle 10 to detect a distance between an object and either the front or the rear of the vehicle. As shown in FIG. 1, the vehicle 10 can be provided with at least one sensor 16 on each of the four sides of the host vehicle 10 such that a distance between the vehicle and an object can be detected with respect to any side of the vehicle 10. The front sensor 16A, the rear sensor 16B, the first side sensor 16C, and the second side sensor 16D are sensors configured to detect the presence of the object and to measure and/or determine the distance between the detected object and the respective adjacent outer surface of the vehicle body structure as the vehicle body structure approaches the detected object. Each of the plurality of sensors 16 is configured to detect the distance between an object and the approaching respective outer surface of the vehicle 10 within a predetermined tolerance of, for example, plus-or-minus one inch (less than three centimeters). However, it should be understood that the tolerances can be greater or can be less, depending upon the size of the vehicle 10 and the specific type of sensors employed.

The display 18 displays, for example, navigation information that indicates the location of the host vehicle 10 with respect to a map, as understood in the art. The display 18 can also display warning signals or information related to operation of the parking memory system as set forth in the flowcharts of FIGS. 2 and 3. The display 18 can incorporate the user input device 24, such as through a touchscreen, thereby allowing a user to interact with the parking memory system 12.

The parking memory system 12 of the host vehicle 10 can further include the vehicle navigation system 20. The vehicle navigation system 20 includes, for example, a communication device 28, such as a GPS (Global Positioning System) communication device, that communicates with the GPS satellites. The communication device 28 can also communicate with one or more terrestrial units and a base station or external server to obtain location information. Furthermore, the vehicle navigation system 20 can include or is in communication with a storage device 30 that can store vehicle information, such as previous vehicle route information, location information, or other vehicle information that the GPS is capable of generating, in addition to map data and other location related data as understood in the art. The vehicle navigation system 20 can receive vehicle data from any suitable source, such as a remote device capable of connecting with the navigation system 20.

The parking memory system 12 of the host vehicle 10 can further include a wireless communication system 22. The wireless communication system 22 is a communication transceiver for performing a wireless communication with an external wireless communication device, as is understood in the art. The wireless communication system 22 can be configured for short-range wireless communication, such as Bluetooth®, and/or for communication over a wireless network.

Figure 4:
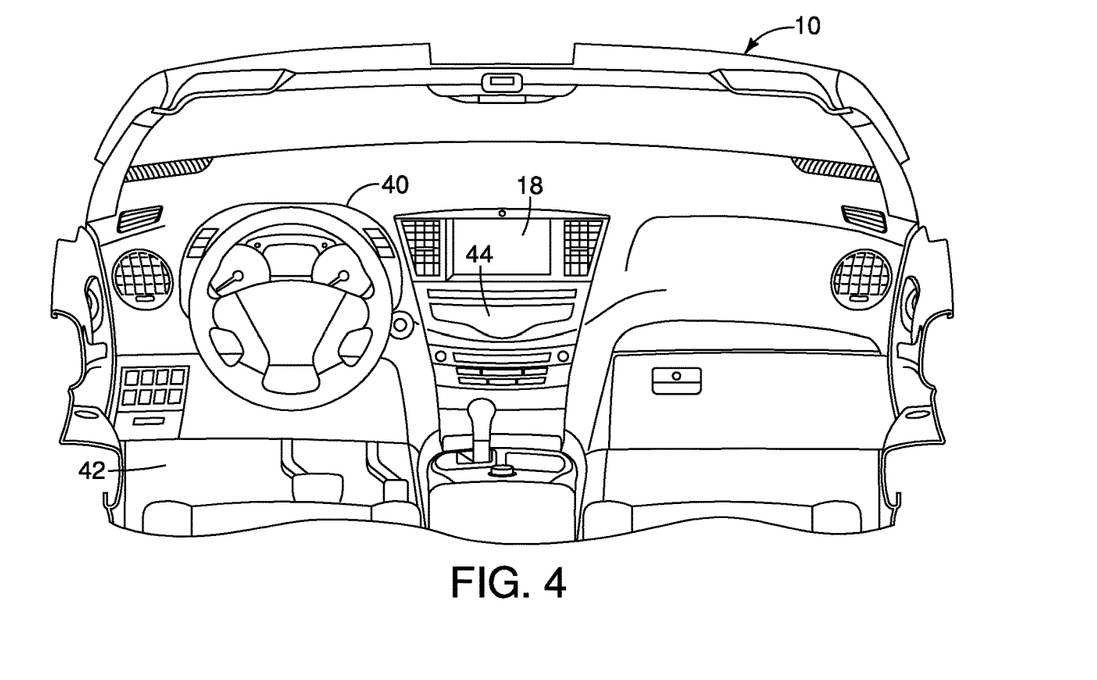
FIG. 4 is an elevational view of an instrument panel in a passenger compartment of the vehicle of FIG. 1.

As shown in FIG. 4, an instrument panel 40 is located within a passenger compartment 42 of the host vehicle 10. The display 18 and a control panel 44 can both be disposed as part of the instrument panel 40. The control panel 44 can also function as part of the user input device 24 for a user to engage the parking memory system 12.

Figure 5:
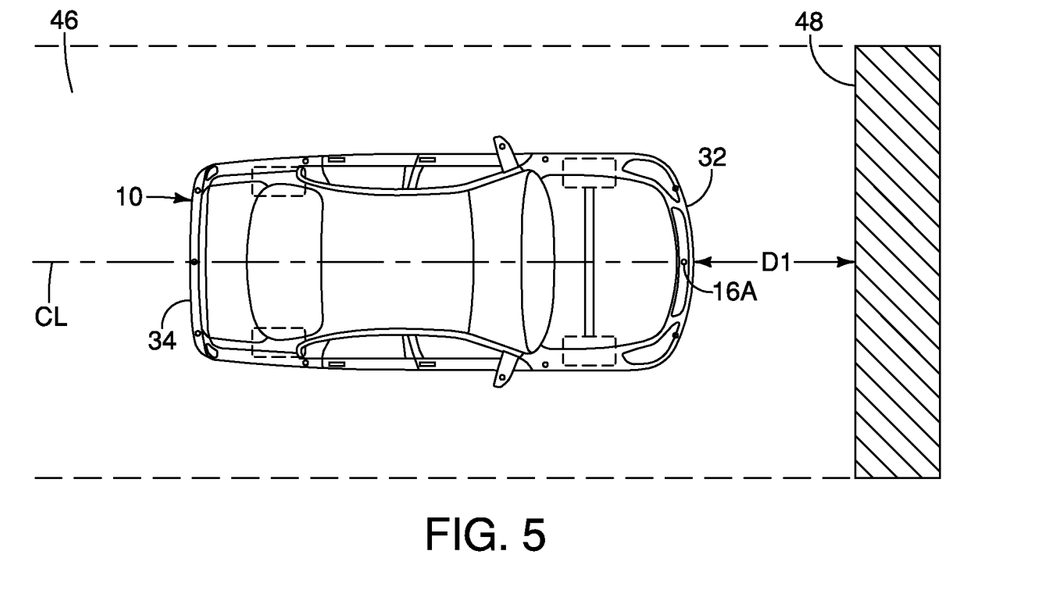
FIG. 5 is a top plan view of a vehicle having the parking memory system of FIGS. 2 and 3 parked a first distance from an object in which the distance is detected by a forward sensor of the vehicle.

FIG. 1 illustrates methods of setting a parking memory with the parking memory system 12 during a first, or initial, parking operation in accordance with exemplary embodiments of the present invention. In step S10, the vehicle 10 is positioned in a desired parked position with respect to an object at a location during a first parking operation. The desired parked position is a parked position in which the user desires to repeatedly park the vehicle during future parking operations in which the vehicle is spaced a desired distance from an object. As shown in FIG. 5, the vehicle 10 is positioned in a desired parked position at a home garage 46 with respect to a wall 48.

In step S12, a distance of the vehicle 10 from an object is detected when the vehicle is in the parked position. As shown in FIG. 5, a distance D1 of the vehicle 10 from an object is detected. The distance D1 from the front 32 of the vehicle 10 to the wall 48 of the garage 46 is detected. A front sensor 16A is used to detect the distance D1 from the front 32 of the vehicle 10 to the wall 48 of the garage 46. By providing the vehicle 10 with a plurality of front sensors 16A, the shortest distance between the front of the vehicle 10 and the wall 46 can be detected when the vehicle is parked such that a longitudinal center line CL of the vehicle 10 is not perpendicular to the wall 46. The desired parking position, as shown in FIG. 5, spaces the front 32 of the vehicle 10 a distance D1 from the wall 48 of the garage. The distance D1 is a longitudinal distance from the front 32 of the vehicle 10 to the wall 48 of the garage 46 detected by the at least one front sensor 16A. Alternatively, the user can manually enter a desired distance for the vehicle 10 to be spaced from the object, which is detected by the controller 14.

The user manually selects a "parking memory" option through the user input device 24 in step S14. The "parking memory" option can be a soft-button on the touchscreen of the display 18 associated with the around-view monitor feature of the vehicle 10, for example. The user then selects the "set parking memory" option to toggle storing the detected distance D1 in step S16. The "set parking memory" option can be a soft-button on the touchscreen of the display 18 that is displayed after selecting the "parking memory" option.

In step S18, the user is prompted to choose a distance setting. The prompts can be soft-buttons displayed on the touchscreen of the display 18 after selecting the "set parking memory" option. The prompts can include front, rear and first and second side sonar to allow the user to select the location of the object to be used as a reference for the parked position of the vehicle during future parking operations. As shown in FIG. 5, the front sonar 16A is selected to detect the distance D1 from the front of the vehicle to the wall 46 of the garage. The distance D1 can be detected responsive to selecting the distance setting in step S18.

The process then moves to one of steps S20, S24 and S28 to store the detected distance D1 in the storage device 26 of the controller 14. Method 1 of step S20 is directed to a user manually saving the detected distance D1 with the user input device 24. Method 2 of step S24 is directed to storing the geographical location of the parked location with the navigation system 20 and associating the distance D1 with the stored geographical location. Method 3 of step S28 is directed to saving the location based on the wireless, or Wi-Fi, network detected in the area with the wireless communication system 22 and associating the detected distance D1 with the detected wireless network.

Step S20 is a first method to store the detected distance D1 from step S12. In step S22, the user manually selects a memory location from a plurality of locations displayed on the touchscreen of the display 18. For example, three memory locations can be presented (i.e., memory location 1, 2 or 3), and the user selects a memory location to store the detected distance D1. By providing a plurality of memory locations, a plurality of distances can be stored in the vehicle memory 26. For example, the user can save a plurality of different distances D1 and D2 (FIG. 6) from the same object (the wall 48) at the same location (the garage 46). The user can also save a plurality of distances D1 and D5 (FIG. 9) from different objects (the wall 48 in FIG. 5 and the wall 54 in FIG. 9) in different locations (the garage 46 in FIG. 5 and the garage 52 in FIG. 9).

Step S24 is a second method to store the detected distance D1 from step S12. In step S26, the navigation system 20 determines and saves the geographical location of the current parking location, such as the geographical coordinates of the garage 46 in FIG. 5. The detected distance D1 is saved with the geographical coordinates of the garage 46 in the vehicle memory 26. When the vehicle 10 is in the office garage 52, the detected distance D5 is saved with the geographical coordinates of the garage 52 in the vehicle memory 26.

Step S28 is a third method to store the detected distance D1 from step S12. In step S30, the wireless communication system 22 detects and saves the available or recognized WIFI network as the current parking location. The detected distance D1 is saved with the available WIFI network in the vehicle memory 26. Alternatively, the wireless communication system 22 communicates through short-range wireless communications, such as Bluetooth®, with a user's mobile device. When the mobile device detects an available wireless network, the wireless network is communicated to the wireless communication system 22 and stored in the vehicle memory 26. The detected distance D1 is saved with the wireless network detected by a user's mobile device in the vehicle memory 26.

After storing the detected distance in one of steps S22, S26 or S30, the user is prompted to enter an identifier to identify the current parking location in step S32. For example, the user can enter, through the touchscreen of the display 18, "home" to identify the home garage 46 shown in FIG. 5 or "work" to identify the work garage shown in FIG. 9. In step S34, the detected distance D1 is stored with the identifier entered by the user in step S32 as a parking memory. When a plurality of detected distances are stored, a unique or different identifier is provided for each of the stored distances to readily distinguish between the parking memories, such as between the distances D1 and D2 from the wall 48 of the garage 46 in FIGS. 5 and 6.

FIG. 3 illustrates methods of recalling a parking memory with the parking memory system 12 during a second, or subsequent, parking operation in accordance with exemplary embodiments of the present invention. In step S50, the vehicle 10 approaches a parking location for which a detected distance has been previously stored in a prior, or first, parking operation, such as in step S34 of FIG. 2. For example, the vehicle 10 approaches the home garage 46, as shown in FIG. 5, during a second parking operation for which the distance D1 is stored and associated with the garage 46 (step S34 of FIG. 2).

The process then moves to one of steps S52, S58 and S62 to recall during the second parking operation the detected distance D1 from the object that was stored in step S34 of FIG. 2. Method 1 of step S52 is directed to a user manually recalling the stored detected distance D1 with the user input device 24, and corresponds to method 1 of step S20 of FIG. 2. Method 2 of step S58 is directed to recalling the stored geographical location of the parked location with the navigation system 20, and corresponds to method 2 of step S24 of FIG. 2. Method 3 of step S62 is directed to recalling the stored location based on the detected wireless network in the area with the wireless communication system 22, and corresponds to method 3 of step S28 of FIG. 2. The user may be presented with a prompt to determine whether the stored parking memory is to be recalled manually (method 1 of step S52), by the navigation system 20 (method 2 of step S58) or by the wireless communication system 22 (method 3 of step S62).

Figure 9:
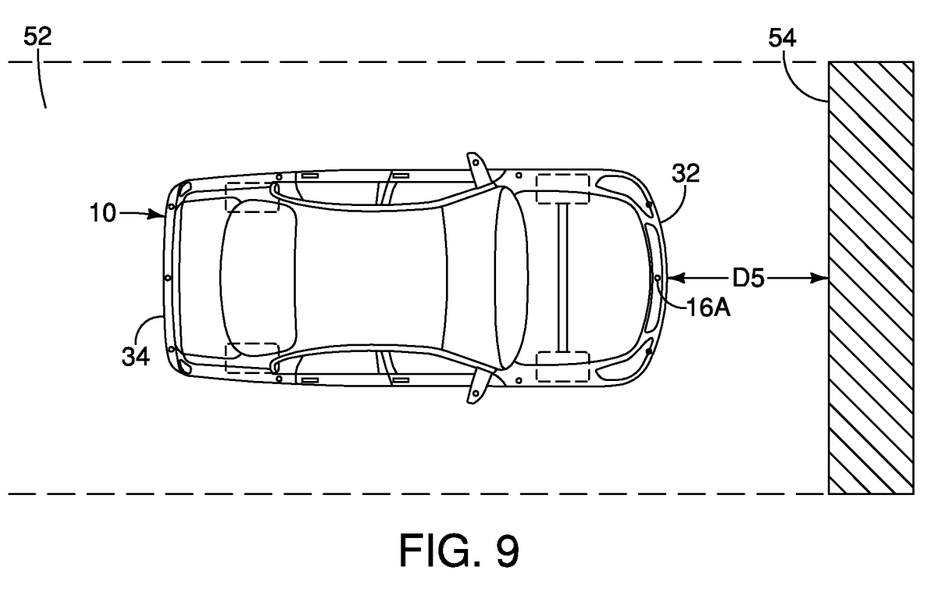
FIG. 9 is a top plan view of the vehicle of FIG. 5 parked a distance from another object in a different parking location in which the distance is detected by the forward sensor of the vehicle.

The process moves to method 1 of step S52 from step S50 when the parking memory for the location has been stored manually by the user, as in steps S20 and S22 of FIG. 2. The user manually selects the "parking memory" option through the user input device 24 in step S54. The user then selects the identifier associated with the current parking location in step S56 for which the parking memory was previously stored in the vehicle memory 26 during the first parking operation. For example, the user selects the "home" button to recall the stored distance D1 associated with the garage 46 as shown in FIG. 5 or the "work" button to recall the stored distance D5 associated with the work garage 52 as shown in FIG. 9.

The process moves to method 2 of step S58 from step S50 when the parking memory for the location has been stored by the navigation system, as in steps S24 and S26 of FIG. 2. The navigation system 20 detects the current geographical location and recalls the parking memory associated with the detected geographical location stored in the vehicle memory 26 in step S60. As shown in FIG. 5, the detected geographical location recalls the distance D1 associated with the home garage 46. As shown in FIG. 9, the detected geographical location recalls the distance D5 associated with the work garage 52.

The process moves to method 3 of step S62 from step S50 when the location has been stored by the wireless communication system 22, as in steps S28 and S30 of FIG. 2. The wireless communication system 22 detects the wireless network available or recognized at the current location and recalls the parking memory associated with the detected wireless network stored in the vehicle memory 26 in step S64. Alternatively, the wireless communication system 22 communicates via a short-range wireless technology, such as Bluetooth®, with the user's mobile device. The wireless communication system 22 detects that the mobile device is connected to the wireless network available or recognized at the current location. As shown in FIG. 5, the wireless communication system 22 detects the wireless network available or recognized at the home garage 46, and recalls the distance D1 associated with the home garage 46. As shown in FIG. 9, the wireless communication system 22 detects the wireless network available or recognized at the work garage 52, and recalls the distance D5 associated with the work garage 46.

After recalling the appropriate parking memory corresponding to the current location, the user proceeds with the second parking operation to park the vehicle in the desired position in which the vehicle is spaced from the object by the distance D1 associated with the recalled parking memory. In step S66, the vehicle provides an indication when the vehicle reaches the distance associated with the recalled parking memory. As shown in FIG. 5, the parking memory for the garage 46 is recalled, and the parking memory system 12 determines when the front 32 of the vehicle 10 is spaced from the wall 48 of the garage 46 by the distance D1. When the front sensor 16A detects that the front 32 of the vehicle 10 is the detected distance D1 from the wall 48 of the garage 46, an indication is provided to the user that the vehicle is spaced from the wall 48 by the distance D1. When a plurality of front sensors 16A are disposed on the front of the vehicle 10, an indication is provided when the first of the plurality of sensors 16A detects that the vehicle 10 is spaced by the distance D1 from the wall 48 of the garage 46. The indication can be a visual indication, such as a text notice displayed on the display 18, an audible indication, such as a beep, or both visual and audible indicia.

Figure 6:
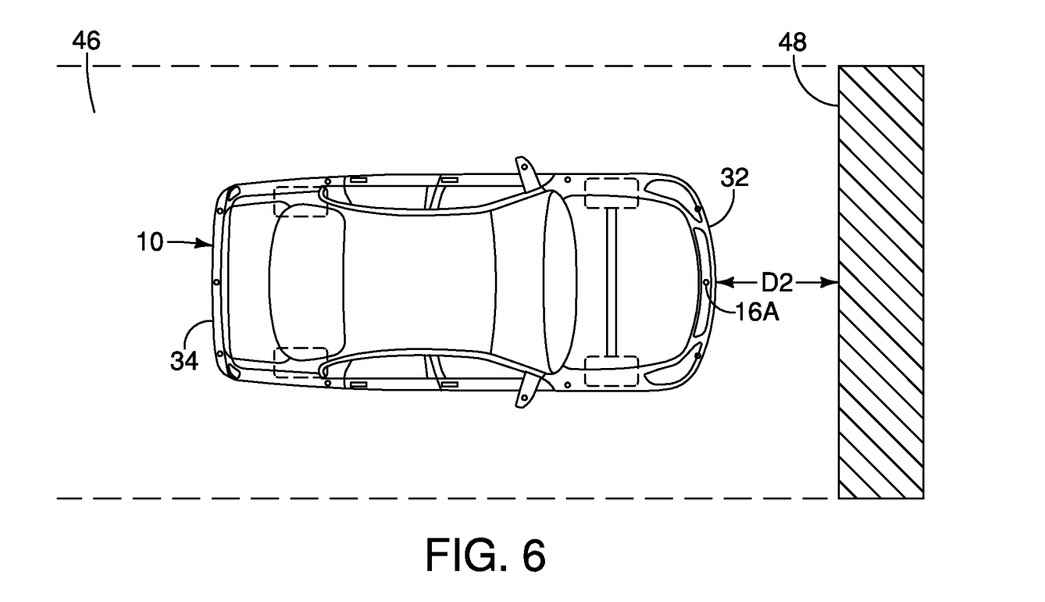
FIG. 6 is a top plan view of the vehicle of FIG. 5 parked a second distance from the object.

Although the above exemplary embodiments are described with respect to storing a detected distance D1, the present invention is equally applicable to storing a plurality of distances at the same parking location. For example, as shown in FIG. 5, a first parking distance D1 is stored and associated with the garage 46. As shown in FIG. 6, a second parking distance D2 can be stored and recalled using the process illustrated in the flowcharts of FIGS. 2 and 3. The second parking distance D2 is less than the first parking distance D1, such that the front 32 of the vehicle 10 is closer to the wall 48. The first parking distance D1 can be associated with a first desired distance from the wall 48, such as if more space in front of the vehicle 10 is desired. The second parking distance D2 can be associated with a second desired distance from the wall 48, such as if more space is desired behind the vehicle 10 to access the trunk. Alternatively, the first and second distances can be associated with different drivers having different desired parking distances from the wall 48 of the garage 46.

Alternatively, the first parking distance D1 in FIG. 5 corresponds to a distance from a first object in a first parking location, and the fifth parking distance D5 in FIG. 9 corresponds to a distance from a second object in a second parking location. The first parking location in FIG. 5 is different from the second parking location in FIG. 9. The first parking location in FIG. 5 is the user's home garage 46, and the second parking location in FIG. 9 is the user's work garage 52. The first distance D1 is set and recalled by the methods illustrated in the flowcharts of FIGS. 2 and 3, and the fifth distance D5 is separately set and recalled by the methods illustrated in the flowcharts of FIGS. 2 and 3. The parking memory system 12 in accordance with the exemplary embodiments of the present invention allows the user to easily set and recall different parking positions at different locations.

Figure 7:
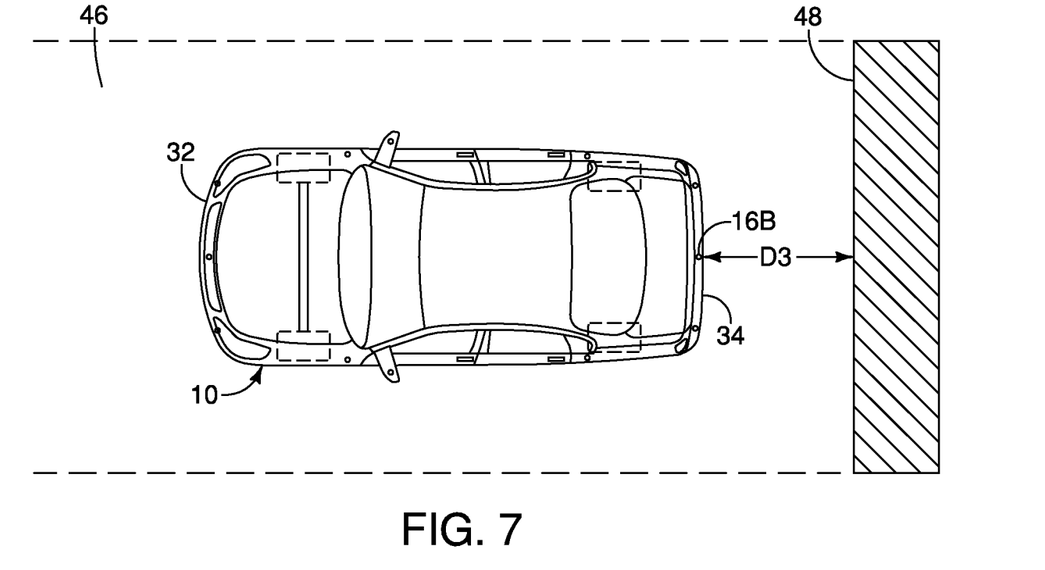
FIG. 7 is a top plan view of the vehicle of FIG. 5 parked a distance from an object in which the distance is detected by a rear sensor of the vehicle.

Although the above exemplary embodiments are described with respect to a vehicle 10 pulling into a parking position in a forward direction, the present invention is equally applicable to the vehicle 10 backing into a parking position as shown in FIG. 7. A rear sensor 16B is used to detect a third distance D3 between the rear 34 of the vehicle 10 and the wall 48 of the garage 46. The third distance D3 is a longitudinal distance from a rear end of the vehicle to the wall 48 detected by the rear sensor 16B. The vehicle 10 can be provided with a plurality of rear sensors 16B, such that the shortest distance between the front of the vehicle 10 and the wall 48 can be detected when the vehicle is parked such that a longitudinal center line CL (FIG. 5) of the vehicle 10 is not perpendicular to the wall 46. Additionally, as described with reference to FIG. 6, a plurality of distances can be stored with regard to the vehicle backing into and/or pulling forward into the parking position. When identifying the location in step S32 of FIG. 2, descriptive identifiers can be used to distinguish between forward and rearward parking positions, as well as different desired parking distances.

Figure 8:
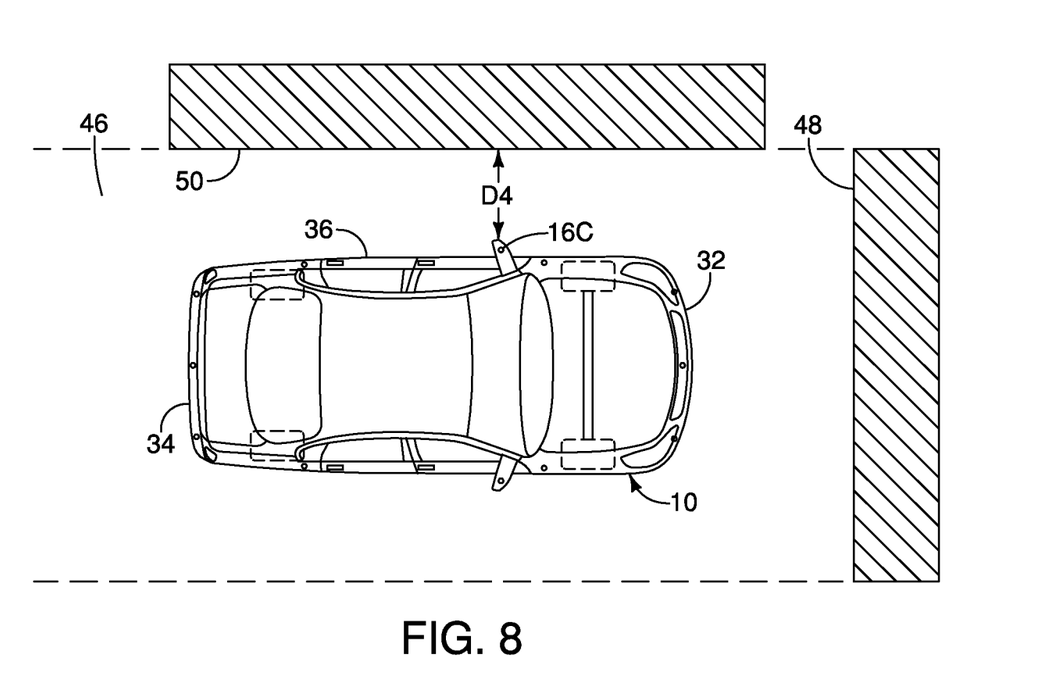
FIG. 8 is a top plan view of the vehicle of FIG. 5 parked a distance from an object in which the distance is detected by a side sensor of the vehicle.

Although the above exemplary embodiments are described with respect to detecting a distance between the wall 48 and either the front 32 or rear 34 of the vehicle 10, the present invention is equally applicable to detecting a distance from a side of the vehicle 10 to an object. As shown in FIG. 8, a first side sensor 16C can be used to detect a fourth distance D4 from the first side 36 of the vehicle 10 to a side wall 50 of the garage 46. The fourth distance D4 is a lateral distance from the first side 36 of the vehicle to the side wall 50 detected by the first side sensor 16C. The vehicle 10 can be provided with a plurality of side sensors 16C, such that the shortest distance between the first side 36 of the vehicle 10 and the side wall 48 can be detected when the vehicle is parked such that a longitudinal center line CL (FIG. 5) of the vehicle 10 is not parallel to the side wall 50. The second side sensor 16D on the second side 38 of the vehicle 10 operates in substantially the same manner as the first side sensor 16C, when a parking distance between the second side 38 of the vehicle 10 and an object is desired.

The exemplary embodiments of the present invention allow a user to store and recall at least one parking memory for at least one location that can be readily recalled to facilitate obtaining a desired parking position during a parking operation.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the parking memory system for a vehicle. Accordingly, these terms, as utilized to describe the present invention should be interpreted relative to a vehicle equipped with the parking memory system for a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A method of positioning a vehicle during a parking operation, comprising
   positioning the vehicle in a parked position during a first parking operation;
   detecting a distance of the vehicle from an object with a sensor when the vehicle is in the parked position after completing the first parking operation;
   storing the distance in a vehicle memory;
   detecting a location of the parked position by a global positioning system and storing the location of the parked position in the vehicle memory, wherein the stored distance is associated with the stored location;

recalling the distance from the object and the location of the parked position during a second parking operation with the vehicle; and providing an indication during the second parking operation when the vehicle is spaced from the object by the distance to indicate the vehicle is in the parked position.

2. The method of positioning the vehicle during the parking operation according to claim 1, wherein
the object is a wall of a garage.

3. The method of positioning the vehicle during the parking operation according to claim 2, wherein
the distance is a longitudinal distance from a forward end of the vehicle detected by a sensor.

4. The method of positioning the vehicle during the parking operation according to claim 2, wherein
the distance is a longitudinal distance from a rear end of the vehicle to the wall detected by a sensor.

5. The method of positioning the vehicle during the parking operation according to claim 2, wherein
the distance is a lateral distance from a side of the vehicle to the wall detected by a sensor.

6. The method of positioning the vehicle during the parking operation according to claim 1, wherein
a plurality of distances are stored in the vehicle memory.

7. The method of positioning the vehicle during the parking operation according to claim 6, wherein
each of the plurality of stored distances corresponds to a different distance from the object.

8. The method of positioning the vehicle during the parking operation according to claim 6, wherein
each of the plurality of stored distances corresponds to a different object in a different location.

9. The method of positioning the vehicle during the parking operation according to claim 8, wherein
each of the plurality of stored distances is provided with a unique identifier.

10. The method of positioning the vehicle during the parking operation according to claim 1, wherein
when the global positioning system detects the vehicle is in the location during the second parking operation, the distance corresponding to the location is recalled.

11. The method of positioning the vehicle during the parking operation according to claim 1, wherein
the indication is an audible indication.

12. The method of positioning the vehicle during the parking operation according to claim 1, wherein
the indication is a visual indication displayed on a display.

13. The method of positioning the vehicle during the parking operation according to claim 1, wherein
the distance between the vehicle and the object is entered by a driver.

14. A method of positioning a vehicle during a parking operation, comprising
positioning the vehicle in a first parked position during a first initial parking operation in a first location;
detecting a first distance of the vehicle from a first object in the first location with a sensor when the vehicle is in the first parked position after completing the first initial parking operation;
storing the first distance in a vehicle memory;
detecting a first location of the first parked position and storing the first location of the first parked position in the vehicle memory with the stored first distance, the first location being detected by either a global positioning system or by a wireless connection through a recognized wireless network, wherein the stored first distance is associated with the stored first location;
positioning the vehicle in a second parked position during a second initial parking operation in a second location;
detecting a second distance of the vehicle from a second object in the second location with the sensor when the vehicle is in the second parked position after completing the second initial parking operation;
storing the second distance in a vehicle memory;
detecting a second location of the second parked position and storing the second location of the second parked position in the vehicle memory with the stored second distance, the second location being detected by either the global positioning system or by the wireless connection through the recognized wireless network, wherein the stored second distance is associated with the stored second location;
recalling the first distance from the first object during a first subsequent parking operation with the vehicle in the first location, the first distance being recalled when either the global positioning system detects the vehicle is in the first location or when the wireless connection recognizes the wireless network;
providing an indication during the first subsequent parking operation when the vehicle is spaced from the first object by the first distance to indicate the vehicle is in the first parked position;
recalling the second stored distance from the second object during a second subsequent parking operation with the vehicle in the second location, the second distance being recalled when either the global positioning system detects the vehicle is in the second location or when the wireless connection recognizes the wireless network; and
providing the indication during the second subsequent parking operation when the vehicle is spaced from the second object by the second distance to indicate the vehicle is in the second parked position.

15. The method of positioning the vehicle during the parking operation according to claim 14, wherein
the first location is different from the second location.

16. The method of positioning the vehicle during the parking operation according to claim 14, wherein
the first distance is different from the second distance.

17. The method of positioning the vehicle during the parking operation according to claim 14, wherein
the first distance is between a front of the vehicle and the first object, and the second distance is between a rear of the vehicle and the second object.

18. A method of positioning a vehicle during a parking operation, comprising
positioning the vehicle in a parked position during a first parking operation;
detecting a distance of the vehicle from an object with a sensor when the vehicle is in the parked position after completing the first parking operation;
storing the distance in a vehicle memory;
detecting a location of the parked position by a wireless connection through a recognized wireless network and storing the location of the parked position in the vehicle memory, wherein the stored distance is associated with the stored location;
recalling the distance from the object and the location of the parked position during a second parking operation with the vehicle; and
providing an indication during the second parking operation when the vehicle is spaced from the object by the distance to indicate the vehicle is in the parked position.

19. The method of positioning the vehicle during the parking operation according to claim 18, wherein
 when the wireless connection recognizes the wireless network during the second parking operation, the distance corresponding to the location is recalled.

\* \* \* \* \*